(12) United States Patent
Matsuo (10) Patent No.: US 6,377,381 B1
(45) Date of Patent: Apr. 23, 2002

(54) LIGHT BEAM DEFLECTION SCANNER

(75) Inventor: Toshihisa Matsuo, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/532,156

(22) Filed: Mar. 21, 2000

(30) Foreign Application Priority Data

Mar. 29, 1999 (JP) .......................................... 11-086765

(51) Int. Cl.$^7$ ................................................ G02B 26/08
(52) U.S. Cl. ........................ 359/204; 359/212; 359/216
(58) Field of Search ................................ 359/204, 216, 359/219; 347/233–236, 243

(56) References Cited

U.S. PATENT DOCUMENTS 6,081,608 A * 6/2000 Fujii et al. .................. 382/112

FOREIGN PATENT DOCUMENTS

| JP | 9230259 | 9/1997 |
| JP | 10052939 | 2/1998 |
| JP | 10206763 | 8/1998 |
| JP | 10209545 | 8/1998 |

* cited by examiner

Primary Examiner—James Phan (57) ABSTRACT

A light beam deflection scanner includes a plural number of semiconductor laser beam elements which are correctable so that they emit beams having an amount of light equal to each other. A light amount correcting circuit in the light beam deflection scanner, effects a correcting process comprising the steps of: emitting a light beam with a predetermined voltage applied to one semiconductor laser beam element; measuring a recovery time from when the light beam detecting sensor detects the light beam until the output voltage from the light beam detecting sensor returns to a predetermined level of voltage, and correcting the light amount of the light beam of the semiconductor laser beam element based on the recovery time.

6 Claims, 9 Drawing Sheets

20
Density sensor

Image pattern

LIGHT BEAM DEFLECTION SCANNER

BACKGROUND OF THE INVENTION

(1) Field of the Invention

The present invention relates to a light beam deflection scanner for use in an electrophotographic recording apparatus.

(2) Description of the Prior Art

Conventionally, there have been electrophotographic recording apparatus in which a light beam modulated based on a image data stream is scanned in the main scan direction to write a static latent image on the photosensitive member surface so that the static latent image is developed into a visual image as a recorded representation. Examples of marketable products in which a recording apparatus is mounted are such digital copiers, laser printers, laser facsimile machines and the like.

Recently on the market, a more speedy recording process has been desired for recording apparatus, so that investigation into speeding up of the electrophotographic process has been continued. Among the apparatus using a laser scanner for illuminating the photosensitive drum surface for the electrophotographic process by scanning a modulated laser beam, the rotational speed of a rotating polygon mirror as a beam deflecting device is increased or the number of mirror facets of the rotational polygon mirror is increased in order to deal with this demand.

However, in order to increase the rotational speed of a rotating polygon mirror, a large-sized mirror motor is needed, which in turn scales up the recording apparatus, conflicting with the tendency toward compactness of the product. Further, a large-sized mirror motor has an increased heating value, so that heat therefrom may cause influences upon inner peripheral devices. Moreover, use of a large-sized mirror motor may generate a large fan-like noise with the rotating polygon mirror, causing a noise problem in a silent office environment.

In recent years, a laser deflection scanner having an increased number of laser beam sources, that is, deflecting at least two laser beams by one facet of a rotating polygon mirror, has been developed and put into practice.

However, if a plural number of semiconductor laser elements are put into use, there occurs a new problem in that the light beam amount emitted from each laser element differs from other elements.

In general, a semiconductor laser element has its own output correcting circuit so as to emit a laser beam of a constant light amount for a predetermined current. However, the characteristic (beam amount) varies depending upon each individual semiconductor laser element (part).

When the light beam emitted from each semiconductor laser element is actually scanned by a laser scanning optical system, the actual amount of light irradiated on the photosensitive member can vary depending upon the distortions of the optical components.

If individual beam irradiated from the different semiconductor laser elements fluctuate as stated above, it is impossible to correctly reproduce and record fine density variations of a recorded image to be reproduced and recorded on the photosensitive member, leading to obstruction to the image reproducibility of an image having smooth gradations (density variations) such as halftone (photographic) image.

To avoid this, in the conventional configuration the light beams being scanned and illuminated on the photosensitive member is detected by a single optical sensor to adjust the amounts of the laser beams from a plural number of semiconductor laser elements so as to be equal to one another. In an actual configuration, since provision of an additional sensor for light amount correction leads to increase in cost, a synchronizing sensor (beam detecting sensor) provided for adjusting the start of scan for one end of the photosensitive member or the starting position of recording by the laser beam is commonly used for adjusting the amount of light beam irradiated from each semiconductor laser element.

The prior art references to the above technology include: Japanese Patent Application Laid-Open Hei 9 No.230259, Japanese Patent Application Laid-Open Hei 10 No.52939, Japanese Patent Application Laid-Open Hei 10 No.206763 and Japanese Patent Application Laid-Open Hei 10 No.209545.

As described in the above publications, conventionally, a plural number of light beams are detected by a single optical sensor, whereby the amounts of light beams irradiated from the individual semiconductor laser elements are corrected to be equal to each other.

However, any of the above needs a complicated correcting circuit configuration, leading to a high price of the apparatus such as a copier etc., which includes such a light beam defection scanner. So there has been earnest desire for a light beam deflection scanner capable of reliable correction with a more simple circuit configuration.

SUMMARY OF THE INVENTION

The present invention has been devised in order to solve the above problems and it is therefore an object of the present invention to provide a light beam deflection scanner with which the amounts of light beams emitted from individual elements can be made equal to each other by a simple configuration.

In order to achieve the above object, the present invention is configured as follows:

In accordance with the first aspect of the invention, a light beam deflection scanner includes: a light beam generating portion having a plural number of laser beam sources to emit light beams from the laser beam sources; a deflection scanning portion for deflecting and scanning the plural light beams from the light beam generating portion; a light beam detecting portion detecting the plural light beams deflected and scanned by the deflection scanning portion to output an electric signal in accordance with the amount of light detected; and a light amount correcting portion correcting the drive voltage of each laser beam source so that the amount of light of each light beam will coincide with the others, and is characterized in that the light amount correcting portion effects a correcting process comprising the steps of: emitting a light beam with a predetermined voltage applied to one laser beam source; measuring a recovery time from when the light beam detecting portion detects the light beam until the output voltage from the light beam detecting portion returns to a predetermined level of voltage; and correcting the light beam amount based on the recovery time.

In accordance with the second aspect of the invention, the light beam deflection scanner having the above first feature is characterized in that the light amount correcting portion effects light amount correction of a light beam by applying the drive voltage determined by the previous light amount correction to the laser beam source.

In accordance with the third aspect of the invention, the light beam deflection scanner having the above first feature is characterized in that the timing of the start of irradiation from each laser beam source in the light beam generating portion is set up so that the voltage recovery time required for the output voltage from the light beam detecting portion due to a first emission from one laser beam source to return to a predetermined level will not overlap the timing at which the light beam detecting portion receives a second emission from another laser beam source.

In accordance with the fourth aspect of the invention, the light beam deflection scanner having the above first feature is characterized in that the deflection scanning portion has a rotating polygon mirror, and if the light beam detecting portion is about to receive light emitted from a second laser beam source during detection of the recovery time of the output voltage from the light beam detecting portion due to a light beam emitted previously from a first laser beam source, the light amount correcting portion briefly prohibits emission from the second laser beam source and causes the second laser beam source to emit a laser beam at such a timing as to irradiate one of the mirror facets of the rotating polygon mirror other than the due one.

In accordance with the fifth aspect of the invention, the light beam deflection scanner having the above first feature is characterized in that, when the recovery time of the output voltage from the light beam detecting portion from the previous detection of a light beam exceeds a predetermined period of time, the light amount correcting portion adjusts the output level of voltage based on which the recovery is assumed to be complete.

In accordance with the sixth aspect of the invention, the light beam deflection scanner having the above first feature is characterized in that the deflection scanning portion has a rotating polygon mirror, and the light amount correcting portion corrects the light amount of a light beam based on the mean recovery time of the output voltage from the light beam detecting portion, obtained by measuring the recovery time for each mirror facet of the rotating polygon mirror and averaging them.

According to the above first feature of the present invention, the light amount correcting portion detects the difference in amount of light between light beams from different laser beams sources, based on the difference in recovery time from when the light beam detecting portion detects a light beam until the output voltage from the detector returns to the predetermined level. Therefore, there is no need to precisely detect the output voltage at the time of beam detection, which leads to a simple configuration for determining the difference in light amount. Thus, it is possible to exactly adjust plural semiconductor laser elements to emit light beams of a substantially equal amount of light, by a simple circuit configuration.

Thus, a recording image is formed on the photosensitive member by plural number of semiconductor elements which have been corrected so as to provide almost the same amount of light, hence it is possible to correctly reproduce fine density variations and hence reproduce an image having continuous tones (density variations) such as a halftone (photographic) image, appropriately, thus providing a commercially valuable copying function.

According to the above second feature of the present invention, the light amount correcting portion effects a subsequent light amount correction by using the drive voltage determined by the previous light amount correction. Therefore, light amount correction of the light beam can be commenced from a state which is relatively close to the target light amount of the light beam, so that the adjustment can be done in a short period.

According to the above third feature of the present invention, while the light beam detecting portion is recovering from the state affected by a previous irradiation from the first laser source, it will not receive a light beam from the second semiconductor source. So it is possible to measure the exact voltage recovery time.

According to the above fourth feature of the present invention, the light beam detecting portion is positively prohibited from receiving a subsequent irradiation of light from the second laser beam source during the period in which the light beam detecting portion is recovering from the state affected by a previous irradiation from the first laser beam source, hence making it possible to detect the exact voltage recovery time.

According to the above fifth feature of the present invention, detection of the amount of light can be performed in a short recovery time by adjusting the output level of voltage based on which the recovery is determined to be complete. Therefore, it is possible to avoid the risk of the light beam detecting portion receiving a subsequent beam emitted from the second laser beam source before the output voltage from the light beam detecting portion, affected by a previous irradiation from the first laser beam source reaches the level above which the recovery is assumed to be complete. Thus, it is possible to detect exact voltage recovery time.

According to the above sixth feature of the present invention, the beams emitted from the laser beam sources can be deflected and scanned by the rotating polygon mirror in a stable manner, not being affected by the characteristics of the mirror facets, thus making it possible to eliminate variations in the recovery time due to individual mirror facets.

BRIEF DESCRIPTION OF THE DRAWINGS

FIGS. 3A and 3B show a time chart for an embodiment of the preset invention in which FIG. 3A is an output signal A from a beam detection sensor and FIG. 3B is a shaped waveform signal B thereof;

FIGS. 6A and 6B show a time chart for an inappropriate example of light amount correction where FIG. 6A is an output signal A from a beam detection sensor and FIG. 6B is a shaped waveform signal B thereof;

DESCRIPTION OF THE PREFERRED EMBODIMENTS

Figure 1:
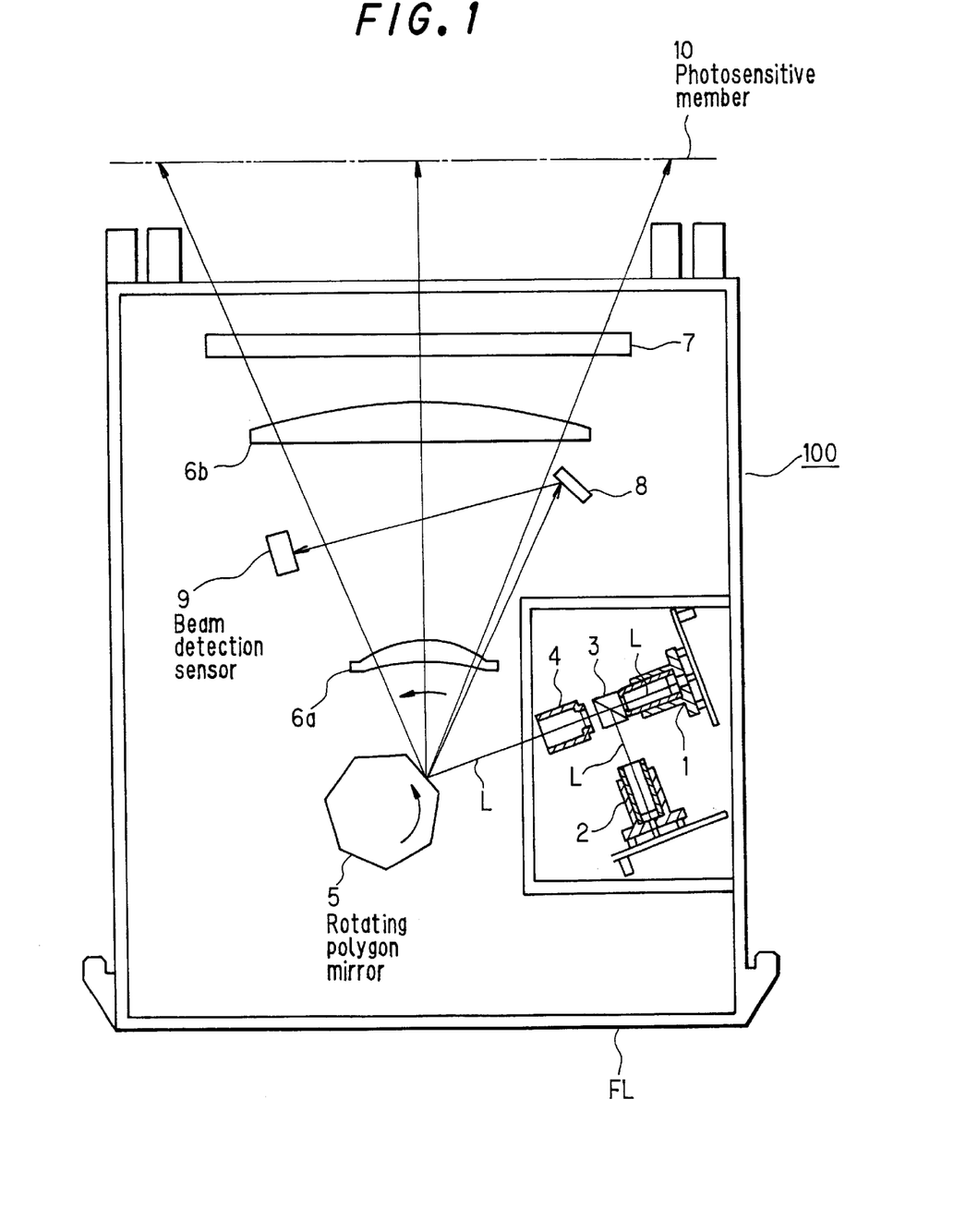
FIG. 1 is an operational, partially sectional view for illustrating a laser beam deflection scanner according to an embodiment of the present invention.

The embodiment of the present invention will hereinafter be described in detail with reference to the accompanying drawings. FIG. 1 is an operational, partially sectional view for illustrating a laser beam deflection scanner 100 with at least two semiconductor laser elements 1 and 2 built therein.

Laser beam deflection scanner 100 has a frame structure member FL in which a variety of scanning optical components are supported with a predetermined positional relationship therebetween.

Laser beams L, emitted from first and second semiconductor laser elements 1 and 2, are made incident on a laser beam splitter 3 in different directions from each other so as to be deflected thereby to be collimated laser beams L, which in turn pass through a cylindrical lens 4 and are introduced into a mirror facet of rotating polygon mirror 5 as a deflector.

Laser beams L are defected and scanned at a constant angular speed by this rotating polygon mirror 5 and pass through a scanner lens system made up of a first lens 6a and a second lens 6b and then reflected by a reflecting mirror 7 onto a photosensitive member 10 (the photosensitive member surface is shown by a chained line in the drawing). Thereby, the laser beams modulated based on an image data stream will form and record a static latent image on photosensitive member 10.

The above scanner lens system is composed of first and second lenses 6a and 6b forming an f-θ lens for converting the equi-angular deflection of the laser beam by rotating polygon mirror 5 into uniform scanning on photosensitive member 10 surface.

On the start side of scan of laser beams L to be deflected and scanned, the laser beams are reflected by a mirror 8 so as to be introduced to a beam detection sensor 9 (which may also be referred to as 'BD sensor' for abbreviation) for detection of the scanning start timing. This is required to adjust the scanning start position of the laser beams being deflection scanned on photosensitive member 10, so that recording of the laser beams modulated based on an image data stream can be started after a lapse of a predetermined time from when beam detection sensor 9 has detected the light beam being deflected and scanned.

In the above configuration, if there is a difference in amount of light between the light sources from first semiconductor laser element 1 and from second semiconductor laser element 2, this will appear as density difference in the image when these laser beams are used to form a static latent image on the photosensitive member by deflection scanning and it is impossible to achieve correct density reproduction of an image, especially when the image has gradations.

To deal with this, in order to enable the above first and second semiconductor laser elements 1 and 2 to write an image with light beam amounts substantially equal to each other, a light amount correcting circuit 200 (shown by a block diagram in FIG. 2) to adjust the amounts of light is provided.

Figure 2:
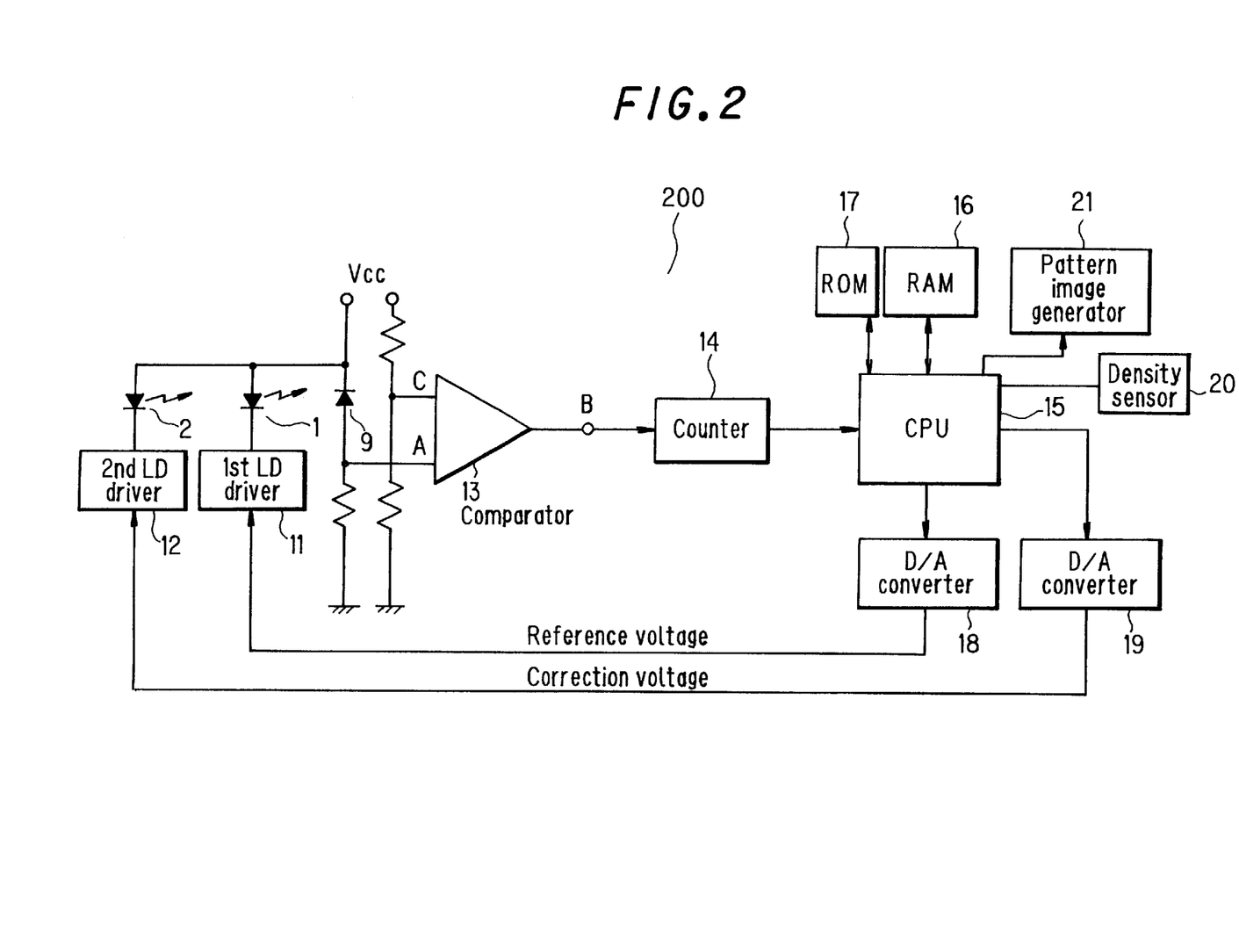
FIG. 2 is a block diagram showing a light amount correcting circuit of a laser beam deflection scanner according to an embodiment of the present invention.

First and second semiconductor laser elements 1 and 2 are driven by first and second LD drivers (drive circuits) 11 and 12, respectively. Thus, predetermined drive currents are supplied to semiconductor laser elements 1 and 2 for their beam emission.

First LD driver 11 and second LD driver 12 are voltage drive circuits of minimum requirement for output level compensation, taking into account the precision variations of the semiconductor laser elements and beam detection sensor 9 as a light beam detecting portion. That is, it is possible to reliably correct the variations in amount of light of a plural number of semiconductor laser elements by adjusting the amount of light in a minimally required manner for output level compensation by considering the variances of the parts.

Next, correction to the amounts of light from first and second semiconductor laser elements 1 and 2 will be described.

When prescribed, correction voltages are successively applied through D/A converters 18 and 19 to first and second LD drivers 11 and 12, respectively, under the control of CPU 15 governing light amount correcting circuit 200, and first and second semiconductor laser elements 1 and 2 are successively turned on to emit light. When beam detection sensor 9 detects (receives) the light beams thus emitted, the voltage level of output signal A from beam detection sensor 9 varies. This output signal A is input to an input terminal of a comparator (operational amplifier) 13 so that the waveform of the output signal is shaped based on a signal C (threshold level) set at a predetermined voltage (Vcc) to thereby provide a shaped waveform signal B.

Figure 3A:
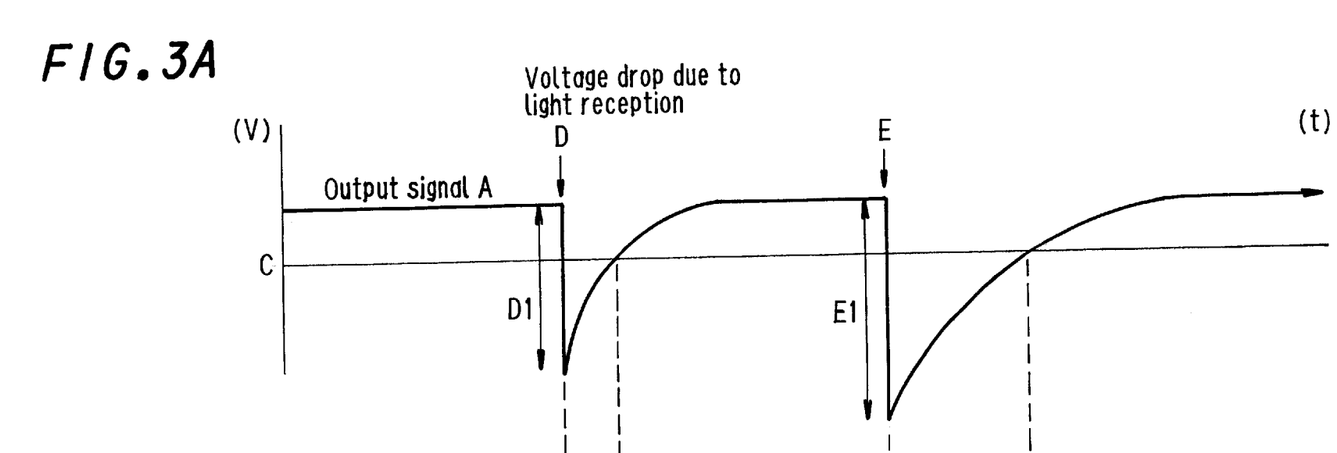
Figure 3B:
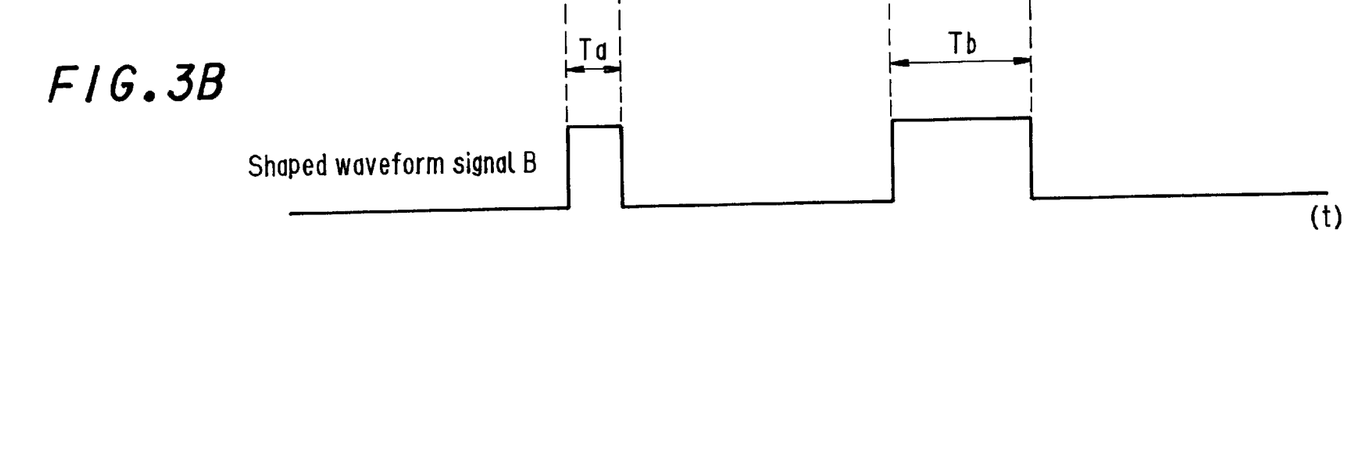

FIGS. 3A and 3B show a time chart in which FIG. 3A is output signal A from beam detection sensor 9 and FIG. 3B is a shaped waveform signal B output in association with the above output.

FIG. 3A shows the state change in voltage of output signal A output from beam detecting sensor 9. That is, output signal A before beam reception is at a constant level. The moment the sensor receives the light beam from semiconductor laser element 1 at a point of time D, a voltage drop D1 occurs. Thereafter, the signal level reverts itself back to the initial level of voltage with the passage of time. Then, the moment the sensor receives the light beam from semiconductor laser element 2 at a point of time E, another voltage drop E1 proportional to the received amount of light occurs. Then the signal level reverts itself back to the initial level of voltage after a predetermined lapse of time.

As shown in FIG. 3A, the difference in amount of light between semiconductor laser elements 1 and 2 produces the difference in voltage drop. This difference in amount of light is observed as the difference in time from an event of a voltage drop to the recovery to the initial voltage.

Therefore, the recovery time from the point of a voltage drop to the restoration of a predetermined threshold voltage C is shown in FIG. 3B.

FIG. 3B shows a shaped waveform signal B which assumes the on-state while output signal A is lower than threshold voltage C and assumes the off-state while output signal A is higher than threshold voltage C. Here, Ta represents the recovery time from when the sensor received the light beam from semiconductor laser element 1 and Tb represents the recovery time from when the sensor received the light beam from semiconductor laser element 2.

Accordingly, in the circuit configuration shown in FIG. 2, the time from a voltage drop when a light beam was emitted from first semiconductor element 1 to the recovery to the predetermined voltage and the time from a voltage drop when a light beam was emitted from second semiconductor element 2 to the recovery to the predetermined voltage are measured. Then the amounts of light from first and second semiconductor laser elements 1 and 2 are adjusted so that the two recovery times become equal.

Actually, in the case where the amount of light from second semiconductor laser element 2 is corrected based on the amount of light from first semiconductor laser element 1, a duration Ta (FIG. 3B) of shaped waveform signal B as to first semiconductor laser element 1 is measured by a counter 14 (to which a reference clock signal is input via an unillustrated line), then second LD driver 12 for driving second semiconductor laser element 2 is controlled using a feedback loop so that a duration Tb (FIG. 3B) of shaped waveform signal B detected when the sensor has detected the light beam emitted from second semiconductor laser element 2 may become equal to Ta.

In the operation flow of this case, information as to the counts on counter 14 of shaped waveform signal B based on the amounts of light of the beams from semiconductor laser elements 1 and 2 is input to CPU 15 and processed therein.

CPU 15 outputs a signal (digital) indicating the correcting amount corresponding to the difference in count number to the D/A converter on the side to be adjusted, i.e., D/A converter 19 for second semiconductor laser element 2 in this case, where the signal is converted into analog signal to output a correcting voltage producing an amount of light to be set to second LD driver 12.

Then, second LD driver 12 supplies a current corresponding to the input corrected voltage to second semiconductor laser element 2. Thus, the amount of light from second semiconductor laser element 2 is set equal to that of first semiconductor laser element 1. It should be noted that first semiconductor laser element 1 is driven with the reference voltage being applied to first LD driver 1.

In the above description, the amount of light from first semiconductor laser element 1 is used as a reference to set the amount of light from second semiconductor laser element 2 at an equal level. Therefore, in this case, the determination of the amount of light from first semiconductor laser element 1 to be the reference is of importance, so this should be done prior to the light amount adjustment on second semiconductor laser element 2. This is why the setting of the amount of light of the reference semiconductor laser element to be used for correction of the amounts of light of plural semiconductor laser elements, or setting of the amount of light (setting of the reference voltage) of the first semiconductor laser element 1 in this case, is described hereinbelow.

Usually, correction to the amount of light from a semiconductor laser element is performed by recording and reproducing a predetermined pattern image on photosensitive member 10 and reading it by an optical sensor so that the recorded and reproduced image will have a prescribed density.

Figure 4:
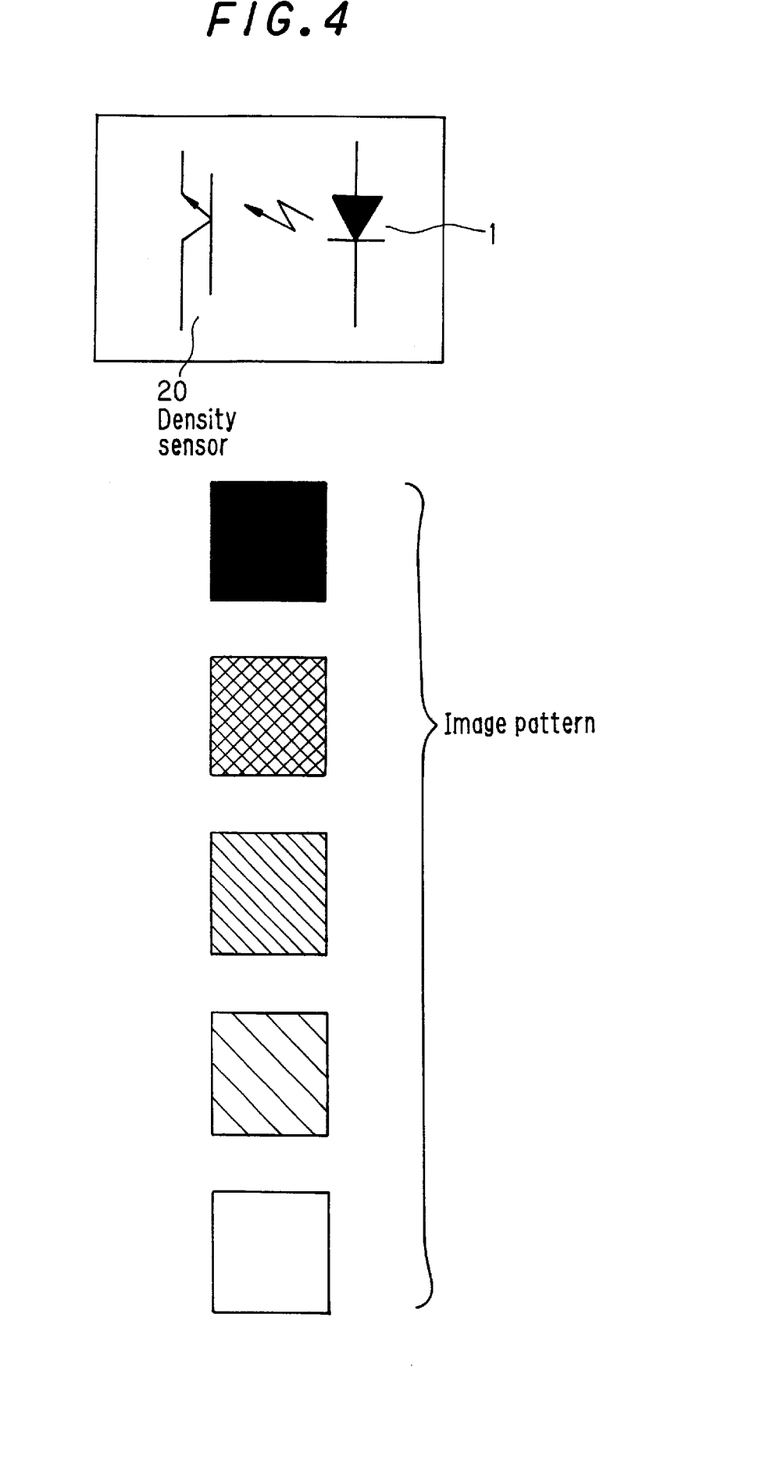
FIG. 4 is a pattern image formed on the photosensitive member for use in light amount correction of a semiconductor laser element.

In this case, CPU 15 employs a pattern image generator 21 to record and reproduce a set image of five patterns having different densities from one another, as shown in FIG. 4, on the photosensitive member. The thus recorded and reproduced patterns of the image are read by a density sensor 20 for reading the image density on photosensitive member 10 so that the densities are compared with reference to a table stored in the data file. That is, it is judged whether the density of each pattern of the image thus picked up coincides with the predetermined set density. If the judgement is negative, the reference voltage to be supplied to first LD driver 11 is controlled, that is, increased or decreased until the predetermined density (density detection signal) can be obtained.

When the predetermined density detection signal has become obtained, the information is stored as reference data into RAM 16.

This reference voltage stored in RAM 16 is supplied to first LD driver 11 so as to drive first semiconductor laser element 1 while the correction target, i.e., second semiconductor laser element 2 is applied with an uncorrected, predetermined voltage. The difference in amount of light in this state is detected in the above-described manner, based on the amount of light from first semiconductor laser element 1 driven by this reference voltage, so as to correct the difference in amount of light thereby reducing the deviation of the amount of light of the second semiconductor element (making the two elements equal to each other).

The voltage applied to the second semiconductor laser element 2 side thus finally corrected is also stored into RAM 16 as the reference voltage data on the second semiconductor laser element. When correction to the amounts of light of the semiconductor laser elements is needed subsequently, the voltages stored as the reference voltage data are used for adjustment, so as to reduce the time for adjustment to as short as possible.

Here, a ROM 17 is provided to store control programs such as of correcting the amounts of light and the like.

Figure 5:
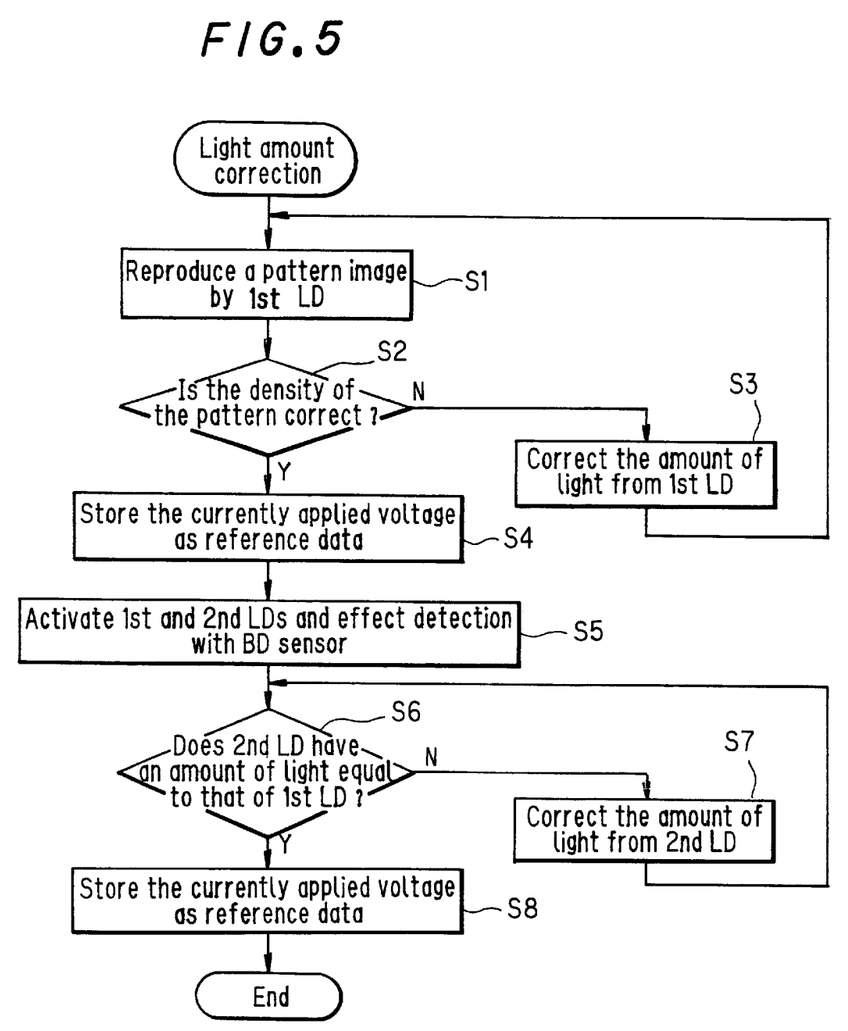
FIG. 5 is a flowchart showing a light amount correcting process for a laser beam deflection scanner according to an embodiment of the present invention.

FIG. 5 is a flowchart schematically illustrating the procedural steps of the light amount correction described heretofore. At a step (to be abbreviated as 'S' hereinbelow) 1, the aforementioned pattern image (shown in FIG. 4) is formed by first semiconductor laser element 1. At S2, it is checked whether the density of the pattern falls within the designated range. If not, the amount of light from first semiconductor laser element 1 is adjusted so that density will fall within the predetermined range (S3).

The adjustment to the amount of light of first semiconductor laser element 1 has been made correctly and the applied voltage here is stored into RAM 16 as reference data (S4).

Next, in order to make the amount of light from semiconductor laser element 2 to be corrected coincide with that of first semiconductor laser element 1, both first and second semiconductor laser elements 1 and 2 are activated and the amounts of light from these laser elements are detected by beam detection sensor 9 (S5). Based on comparison as to the recovery time as mentioned above, it is checked as to whether the amounts of light from the two elements are equal to each other (S6).

Here, if the amounts of light from the two elements differ from each other, operation goes to S7 where the correction voltage is corrected at S6 until the amount of light from second semiconductor laser element 2 becomes equal to that of first semiconductor laser element, that is, until the recovery times are equal to each other.

Thereafter, when the judgement at S6 is affirmative (Yes), the applied voltage to second semiconductor laser element 2 is also stored into RAM 16 as reference data (S8).

In the configuration described heretofore, if the first semiconductor laser element emits an excessive amount of light, or if the position of the start of emission of first semiconductor laser element 1 is close to that of second semiconductor laser element 2, there is a risk that the recovery time due to beam reception from first semiconductor laser element 1 may overlap part of the light emission timing of second semiconductor laser element 2, possibly causing failure to detect the exact recovery time. This results in being unable to correct the amount of light. This will be explained more specifically with reference to FIG. 6.

FIG. 6 is a time chart showing a signal A output from beam detection sensor 9 with a shaped waveform signal B output in association therewith, as in FIG. 3. This chart shows a case where the position at the start of emission of first semiconductor laser element 1 is close to that of second semiconductor laser element 2.

Figure 6A:
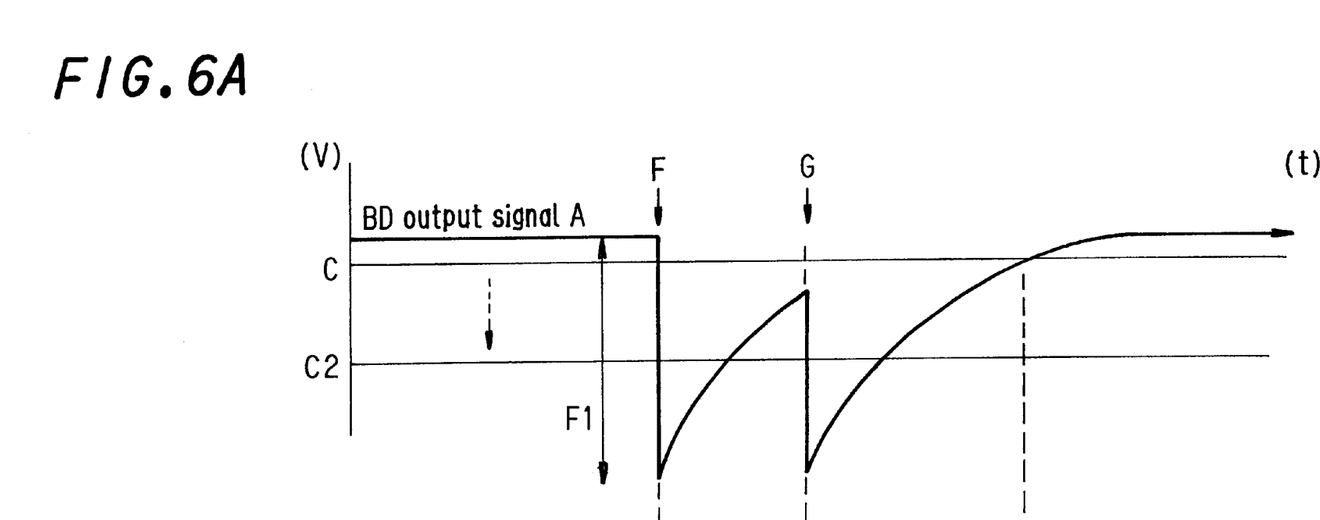
Figure 6B:
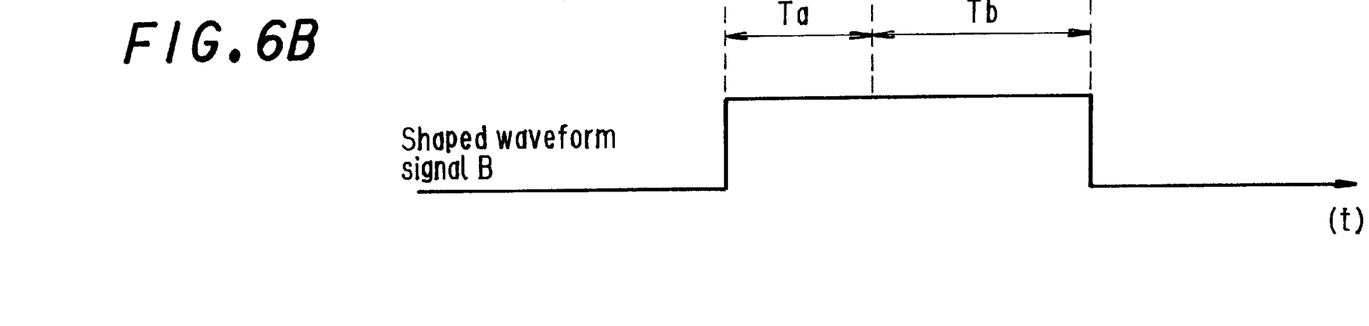

FIG. 6A shows the state change in voltage of output signal A from beam detection sensor 9. That is, output signal A before beam reception is at a constant level. The moment the sensor receives a light beam from semiconductor laser element 1 at a point of time F, a voltage drop F1 occurs. Thereafter, the signal level reverts itself back toward the initial level of voltage with the passage of time. The sensor, however, receives a light beam from semiconductor laser element 2 during the recovery time which is halfway to the initial level of voltage, at a point of time G, another voltage drop F1 proportional to the received amount of light occurs. Then the signal level reverts itself back to the initial level of voltage after a predetermined lapse of time Therefore, in the case shown in FIG. 6A, the level of signal A has not reached threshold voltage C at the point of time G, so that the time Ta in FIG. 6B will not present a correct recovery time due to the light beam from semiconductor laser element 1.

Usually, the recovery time of the output voltage from BD sensor 9 is assumed based on the parts characteristics of semiconductor laser elements 1 and 2 and BD sensor 9 so that second semiconductor laser element 2 is adapted to be activated taking into account the assumed recovery time to achieve light amount correction. However, variations in the accuracy of the parts, variations in the assembly of individual units (laser scan units) may cause the recovery time to fall outside of the assumed range, and hence the time of light emission from second semiconductor laser element 2 may occur during the recovery time due to beam reception from first semiconductor laser element 1.

When the above problem occurs, the threshold level may be adjusted or lowered from C to C2 as shown in FIG. 6A so that the recovery time can be measured properly. Thus, it becomes possible to attain exact correction of the amount of light of the semiconductor laser element.

When the first semiconductor laser element emits an excessive amount of light, the recovery time of the output voltage after reception of the emitted light becomes long so that the recovery time will overlap the time of emission of the second semiconductor laser. Therefore, also in a case where the recovery time due to beam reception from first semiconductor laser element 1 exceeds the predetermined period of time, the threshold voltage C based on which the recovery is assumed to be complete should be adjusted. By this configuration, the BD sensor will not receive a light beam from second semiconductor element 2 while the BD sensor's output voltage is in the recovery stage after its previous reception of a light from the first semiconductor laser element. So it is possible to detect the exact voltage recovery time.

Figure 7:
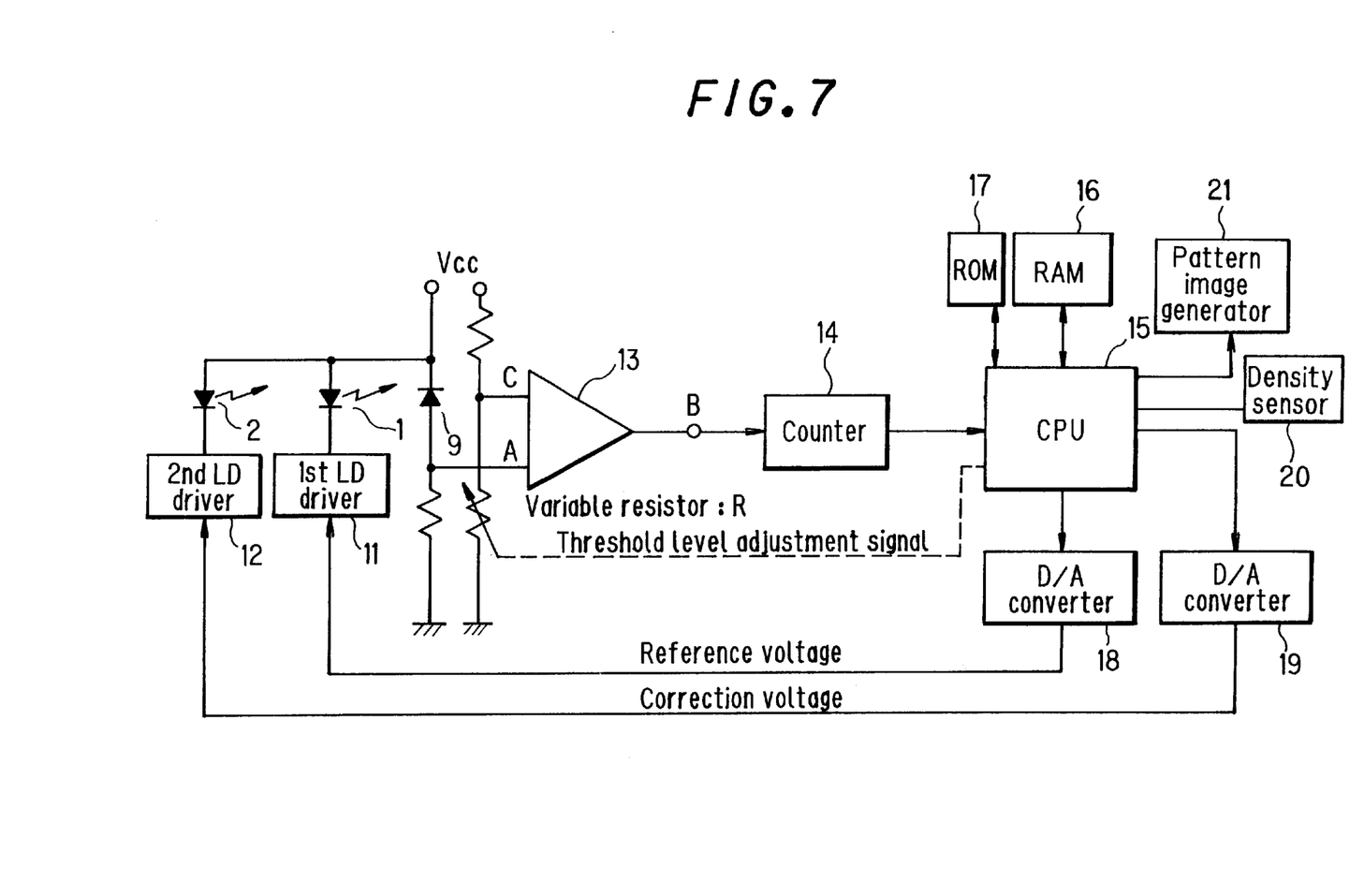
FIG. 7 is a block diagram showing a light amount correcting circuit of a laser beam deflection scanner according to an embodiment of the present invention.
Figure 8:
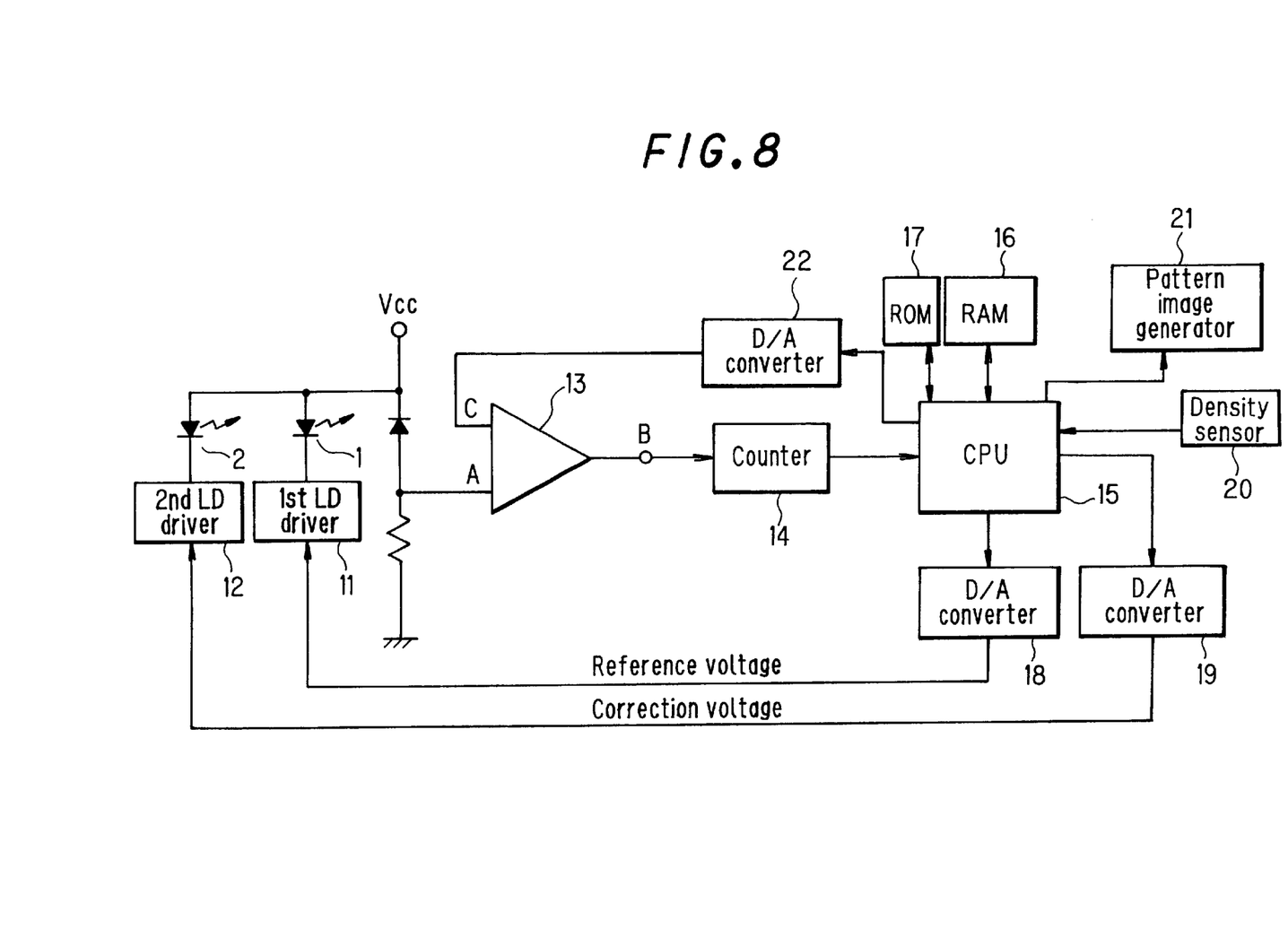
FIG. 8 is a block diagram showing a light amount correcting circuit of a laser beam deflection scanner according to an embodiment of the present invention.

FIGS. 7 and 8 show light amount control circuits which permit modification of threshold voltage C based on which the recovery is assumed to be complete.

The light amount control circuit shown in FIG. 7 has almost the same configuration as light amount control circuit 100 shown in FIG. 2, except in that the resistor connected at its one end to the input terminal for signal C to comparator 13 and grounded at the other end is replaced with a variable resistor R of which the resistance can be varied by instruction from CPU 15. When a threshold adjustment signal is output from CPU 15, this signal enters variable resistor R as a voltage divider for designating a threshold level so as to change the resistance of variable resistor R. Other configurations are the same as FIG. 2 so that the description is omitted.

The light amount control circuit shown in FIG. 8 has almost the same configuration as light amount control circuit 100 shown in FIG. 2. However, a D/A converter 22 is provided between the input terminal for signal C to comparator 13 and CPU 15.

In the circuit in FIG. 8, CPU 15 directly inputs the threshold level to comparator 13 by way of D/A converter 22 so as to change the threshold level.

Other than the above, in order to avoid such a problem as shown in FIG. 6, if the controller circuit determines that the problem of foregoing type will occur, the light emission timing of second semiconductor laser element 2 may be shifted so that reception of the laser beam from first semiconductor laser element 1 and reception of the laser beam from second semiconductor laser element 2 are allotted to different mirror facets of rotating polygon mirror 5. That is, it is possible to avoid the above situation by detecting the amount of light from first semiconductor laser element 1 using a first mirror facet and that from second laser element 2 using a second mirror facet.

Figure 9:
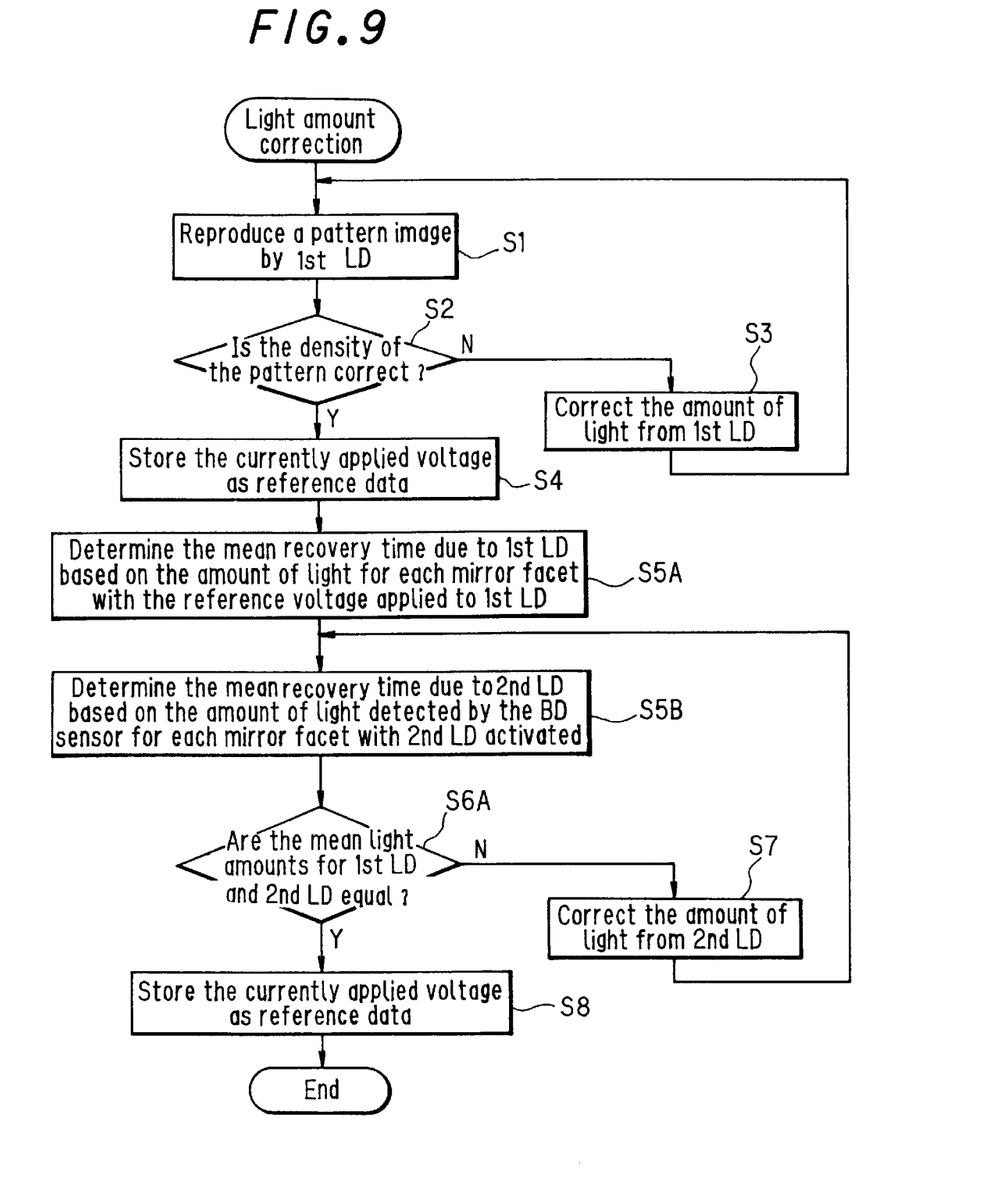
FIG. 9 is a flowchart showing a light amount correcting process for a laser beam deflection scanner according to another embodiment of the present invention.

FIG. 9 is a flowchart showing the procedural steps of another light amount control. Here, this procedure is that which takes into account variations in mirror surface accuracy of the mirror facets in rotating polygon mirror 5.

First, steps S1 to S4 are the same as that shown in FIG. 5.

Then, at S5A, the recovery time of the BD sensor output due to beam reception from first semiconductor laser element 1 is measured for all the mirror facets of rotating polygon mirror 5, to be averaged to obtain the mean recovery time. Subsequently, at S5B, the mean recovery time with respect to second semiconductor laser element 2 is obtained in a similar manner.

Based on the thus obtained mean recovery time as to the first and second semiconductor laser elements 1 and 2, the difference in mean light amount is calculated at S6A to be used for the adjustment on the light amount of second semiconductor laser element 2 at S7.

Thereafter, when it has been determined that the mean light amounts are equal at S6A, the applied voltage to second semiconductor laser element 2 is also stored into RAM 16 as reference data (S8).

Thus, the process illustrated above makes it possible to achieve stable image scan-recording with each individual facet, not being affected by variations of the mirror facets of rotating polygon mirror 5.

As has been described heretofore, according to the first aspect of the present invention, the light amount correcting portion detects the difference in amount of light between light beams from different laser beams sources, based on the difference in recovery time from when the light beam detecting portion detects a light beam until the output voltage from the detector returns to the predetermined level. Therefore, there is no need to precisely detect the output voltage at the time of beam detection, which leads to a simple configuration for determining the difference in light amount. Thus, it is possible to exactly adjust plural semiconductor laser elements to emit light beams of a substantially equal amount of light, by a simple circuit configuration.

Thus, a recording image is formed on the photosensitive member by plural number of semiconductor elements which have been corrected so as to provide almost the same amount of light, hence it is possible to correctly reproduce fine density variations and hence reproduce an image having continuous tones (density variations) such as a halftone (photographic) image, appropriately, thus providing a commercially valuable copying function.

According to the second aspect of the present invention, the light amount correcting portion effects a subsequent light amount correction by using the drive voltage determined by the previous light amount correction. Therefore, light amount correction of the light beam can be commenced from a state which is relatively close to the target light amount of the light beam, so that the adjustment can be done in a short period.

According to the third aspect of the present invention, while the light beam detecting portion is recovering from the state affected by a previous irradiation from the first laser source, it will not receive a light beam from the second semiconductor source. So it is possible to measure the exact voltage recovery time.

According to the fourth aspect of the present invention, the light beam detecting portion is positively prohibited from receiving a subsequent irradiation of light from the second laser beam source during the period in which the light beam detecting portion is recovering from the state affected by a previous irradiation from the first laser beam source, hence making it possible to detect the exact voltage recovery time.

According to the fifth aspect of the present invention, detection of the amount of light can be performed in a short recovery time by adjusting the output level of voltage based on which the recovery is determined to be complete. Therefore, it is possible to avoid the risk of the light beam detecting portion receiving a subsequent beam emitted from the second laser beam source before the output voltage from the light beam detecting portion, affected by a previous irradiation from the first laser beam source reaches the level above which the recovery is assumed to be complete. Thus, it is possible to detect exact voltage recovery time.

According to the sixth aspect of the present invention, the beams emitted from the laser beam sources can be deflected and scanned by the rotating polygon mirror in a stable manner, not being affected by the characteristics of the mirror facets, thus making it possible to eliminate variations in the recovery time due to individual mirror facets.

What is claimed is:

1. A light beam deflection scanner comprising:
   a light beam generating portion having a plural number of laser beam sources so as to emit a plurality of light beams from the laser beam sources;
   a deflection scanning portion for deflecting and scanning the plurality of light beams from the light beam generating portion;
   a light beam detecting portion detecting the plurality of light beams deflected and scanned by the deflection scanning portion so as to output an electric signal in accordance with the amount of light detected; and
   a light amount correcting portion correcting the drive voltage of each laser beam source so that the amount of light of each light beam will coincide with the other, the light amount connecting portion including, apparatus for emitting a light beam with a predetermined voltage applied to one laser beam source, apparatus for measuring a recovery time from when the light beam detecting portion detects the light beam until the output voltage from the light beam detecting portion returns to a predetermined level of voltage, and apparatus for correcting the light beam amount based on the recovery time.

2. The light beam deflection scanner according to claim 1, wherein the light amount correcting portion effects a correction of the amount of light in the light beam by applying a drive voltage determined by the previous light amount correction to the laser beam source.

3. The light beam deflection scanner according to claim 1, wherein the timing of the start of irradiation from each laser beam source in the light beam generating portion is set up so that the voltage recovery time required for the output voltage from the light beam detecting portion due to a first emission from one laser beam source to return to a predetermined level will not overlap the timing at which the light beam detecting portion receives a second emission from another laser beam source.

4. The light beam deflection scanner according to claim 1, wherein the deflection scanning portion has a rotating polygon mirror, and if the light beam detecting portion is about to receive light emitted from a second laser beam source during detection of the recovery time of the output voltage from the light beam detecting portion due to a light beam emitted previously from a first laser beam source, the light amount correcting portion briefly prohibits emission from the second laser beam source and causes the second laser beam source to emit a laser beam at such a time so as to irradiate one of the mirror facets of the rotating polygon mirror other than the one due.

5. The light beam deflection scanner according to claim 1, wherein, when the recovery time of the output voltage from the light beam detecting portion from the previous detection of a light beam exceeds a predetermined period of time, the light amount correcting portion adjusts the output level of voltage based on which the recovery is assumed to be complete.

6. The light beam deflection scanner according to claim 1, wherein the deflection scanning portion has a rotating polygon mirror, and the light amount correcting portion corrects the light amount of a light beam based on the mean recovery time of the output voltage from the light beam detecting portion, obtained by measuring the recovery time for each mirror facet of the rotating polygon mirror and averaging them.

\* \* \* \* \*